United States Patent
Hettel et al.

(10) Patent No.: US 10,236,787 B2
(45) Date of Patent: Mar. 19, 2019

(54) DEVICE FOR OPERATING A RECTIFIER, IN PARTICULAR A SEMI-CONTROLLED RECTIFIER BRIDGE, AND METHOD FOR OPERATING A RECTIFIER

(71) Applicant: SEW-EURODRIVE GMBH & CO. KG, Bruchsal (DE)

(72) Inventors: Norbert Hettel, Au am Rhein (DE); Hans Jürgen Kollar, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 84 days.

(21) Appl. No.: 15/306,703

(22) PCT Filed: Apr. 13, 2015

(86) PCT No.: PCT/EP2015/000769
§ 371 (c)(1),
(2) Date: Oct. 25, 2016

(87) PCT Pub. No.: WO2015/165569
PCT Pub. Date: Nov. 5, 2015

(65) Prior Publication Data
US 2017/0047858 A1 Feb. 16, 2017

(30) Foreign Application Priority Data
Apr. 30, 2014 (DE) .......................... 10 2014 006 365

(51) Int. Cl.
*H02M 7/04* (2006.01)
*H02M 1/32* (2007.01)
(Continued)

(52) U.S. Cl.
CPC ............... *H02M 7/04* (2013.01); *H02M 1/32* (2013.01); *H02M 7/1626* (2013.01);
(Continued)

(58) Field of Classification Search
CPC .. H02M 7/1623; H02M 7/1626; H02M 1/084; H02M 7/162; H02M 1/081; H02M 7/04; H02M 1/32; H02M 2001/0006
See application file for complete search history.

(56) References Cited

U.S. PATENT DOCUMENTS 5,995,395 A   11/1999  Rivet
6,038,155 A *  3/2000  Pelly ..................... H02M 1/36
                                                      363/125
(Continued)

FOREIGN PATENT DOCUMENTS

DE    31 44 950     5/1983
DE    101 01 988    7/2002
(Continued)

OTHER PUBLICATIONS

International Preliminary Report on Patentability, dated Nov. 16, 2016, issued in corresponding International Application No. PCT/EP2015/000769.

(Continued)

*Primary Examiner* — Jue Zhang
*Assistant Examiner* — Lakaisha Jackson
(74) *Attorney, Agent, or Firm* — Hunton Andrews Kurth LLP

(57) ABSTRACT

In a device for operating a rectifier, in particular a semi-controlled rectifier bridge, and a method for operating a rectifier, in particular a power converter, the rectifier is supplied from system phases, in particular from a three-phase AC voltage system, and supplies a unipolar voltage on the output side, the rectifier including controllable switches, in particular semiconductor switches such as thyristors, etc., a respective system phase supplying a respective current source, the current generated in each case being used as trigger signal for the controllable switch allocated to the (Continued)

respective system phase as a function of the state of a controllable switch unit.

19 Claims, 4 Drawing Sheets

(51) Int. Cl.
    *H02M 7/162* (2006.01)
    *H02M 1/084* (2006.01)
    *H02M 1/08* (2006.01)
    *H02M 1/00* (2006.01)

(52) U.S. Cl.
    CPC ............ *H02M 1/081* (2013.01); *H02M 1/084* (2013.01); *H02M 7/162* (2013.01); *H02M 7/1623* (2013.01); *H02M 2001/0006* (2013.01)

(56) References Cited

U.S. PATENT DOCUMENTS

| | | | |
|---|---|---|---|
| 6,222,749 B1 | 4/2001 | Peron | |
| 8,154,895 B2* | 4/2012 | Gilmore | H02M 7/1626 363/129 |
| 9,112,422 B1* | 8/2015 | Vinciarelli | H02M 3/33507 |
| 9,787,210 B2* | 10/2017 | Patel | H02M 5/44 |
| 2009/0052217 A1* | 2/2009 | Talja | H02M 5/4505 363/164 |
| 2010/0039162 A1 | 2/2010 | Laitinen et al. | |
| 2010/0226153 A1* | 9/2010 | Kaulio | H02M 7/219 363/77 |
| 2011/0044080 A1* | 2/2011 | Ristimaki | H02M 1/32 363/126 |

FOREIGN PATENT DOCUMENTS

| | | |
|---|---|---|
| DE | 10 2004 016 062 | 10/2005 |
| DE | 10 2008 052 545 | 4/2010 |
| EP | 0 286 510 | 10/1988 |
| JP | H08-214598 | 8/1996 |

OTHER PUBLICATIONS

International Search Report, dated May 29, 2015, issued in corresponding International Application No. PCT/EP2015/000769.

* cited by examiner

DEVICE FOR OPERATING A RECTIFIER, IN PARTICULAR A SEMI-CONTROLLED RECTIFIER BRIDGE, AND METHOD FOR OPERATING A RECTIFIER

FIELD OF THE INVENTION

The present invention relates to a device for operating a rectifier, in particular a semi-controlled rectifier bridge, and to a method for operating a rectifier.

BACKGROUND INFORMATION

It is generally known that a DC voltage can be generated from a three-phase system voltage with the aid of a bridge rectifier and a capacitor connected on the output side.

SUMMARY

Example embodiments of the present invention provide for achieving a limitation of the charging current.

Among features of example embodiments of the present invention in the rectifier bridge, in particular a power converter, are that the rectifier is supplied from system phases, in particular from a three-phase AC voltage supply, and provides a unipolar voltage on the output side.

The rectifier has controllable switches, in particular semiconductor switches such as thyristors, etc.

A respective system phase supplies a respective current source, the current generated in each case being used as trigger signal for the controllable switch assigned to the respective system phase as a function of the state of a controllable switch unit, in particular as a function of the state of a zero-voltage switch NSS.

This has the advantage that the switches are controlled into the conductive state, that is to say, are fired in the current zero crossing, or at least in close proximity to the current zero crossing. Low losses are achievable as a result. In addition, a high-voltage switch may be saved and no mechanical switches are needed. Furthermore, faulty triggering of the zero-voltage switch is able to be prevented.

A switch S2, which is supplied via a one-way rectifier from the respective system phase, may form the respective current source, whose control input is likewise supplied from the output of the one-way rectifier, in particular from the unipolar output voltage of the one-way rectifier, as long as a switch S3 of the controllable switch unit is open, and whose control input is able to be brought to a higher potential in comparison to the respective system phase, in particular an upper intermediate-circuit potential, that is to say, in particular an upper output potential of the rectifier, when switch S3 of the controllable switch unit is closed, in particular so that no current from one of the current sources is able to be supplied to the controllable switches of the rectifier.

This is considered advantageous in that the current source is able to be controlled and/or the forwarding of the current of the current source is able to be prevented, so that the controllable switches of the rectifier will not be triggered.

Switch S3 is able to be triggered as a function of signals from a higher-level control, in particular, switch S3 is able to be triggered as a function of a zero-voltage switch, the state of the zero-voltage switch in particular being a function of the intermediate-circuit voltage, in particular of the upper output potential of the rectifier and a respective system phase voltage, as well as a function of signals from a higher-level control. This has the advantage that the current source can easily be deactivated and/or switched off.

A capacitor, in particular an intermediate-circuit capacitor, may be situated at the rectifier on the output side, and/or a series connection, made up of a braking resistor and a controllable switch, in particular a braking chopper, may be situated at the rectifier on the output side. This has the advantage that excess energy, e.g., regeneratively produced energy, is able to be carried off.

The controllable switch unit may include switches (S3), which are able to be triggered by a trigger, in particular a zero-voltage switch, a respective switch being allocated to a respective system phase, the trigger in particular being controllable by a higher-level control with the aid of a trigger signal NSS_OFF, and/or the triggerable switches being controllable by a trigger signal GR_OFF from a higher-level control. This has the advantage of allowing a simple enabling of the zero-voltage switch in that no control voltage is supplied by the higher-level control. The withdrawal of the enablement, on the other hand, must then be implemented by applying a control voltage. Simple controllability is obtainable as a result.

Each current source may be controllable, in particular through a control signal GR_OFF supplied by a higher-level control. This has the advantage of once again ensuring easy controllability.

The controllable switches of the rectifier, in particular thyristors, may be situated in the upper branch of each half-bridge of the rectifier. This has the advantage that the rectifier can be controlled, and the intermediate circuit may thus be charged only according to the energy requirement. In addition, limiting of the charging current of the intermediate-circuit capacitor is possible.

A switch in a drain configuration may be used as the current source in each case, and/or a MOSFET switch in a source configuration may be used as the controllable switch of the switch unit in each case. This is considered advantageous insofar as a switch having an uncomplicated and controllable circuitry is employed.

An overvoltage protector may be supplied from the system phases, the overvoltage protection in particular having a capacitor and diodes, and current from a system phase is able to be forwarded to the capacitor via the respective diode, a resistor being switched in parallel with the capacitor, in particular. This is considered advantageous since it allows a very rapid reaction to voltage changes. Especially in case of a rapid voltage rise, the excess energy can be supplied to the capacitor with the aid of the overvoltage suppressor, so that the voltage peak is able to be reduced.

Among features of the method for operating a rectifier which, in particular, includes an at least semi-controlled rectifier bridge, in particular a power converter, are that the rectifier is supplied from system phases, in particular from a three-phase AC voltage supply, and provides a unipolar voltage on the output side, the rectifier includes controllable switches, in particular semiconductor switches such as thyristors, etc., each respective system phase being assigned at least one controllable switch, the rectifier supplies a capacitor, in particular an intermediate-circuit capacitor, on the output side, i.e. on the DC voltage side, a respective current source is supplied from a respective system phase, the current generated by the respective current source being used as control current for the controllable switch assigned to the respective system phase as a function of the signal from a higher-level control, and if enabling by the higher-level control is present, the capacitor is charged from one of the system phases with a voltage that increases essentially from zero, in particular a system quarter period.

This has the advantage that the charging of the intermediate-circuit capacitor starts in the zero crossing and that the charging current is able to be limited. This is due to the fact that only one of the phases supplies the charging current, and that the voltage rise follows the system phase voltage rise, i.e. a sinusoidal characteristic in a quarter period.

The current generated by the current source may be forwarded to the controllable switch of the rectifier if the corresponding system phase voltage is greater than the output voltage of the rectifier, i.e. the intermediate-circuit voltage, and if it is lower than a voltage value that exceeds the intermediate-circuit voltage by a predefined voltage differential value, whose absolute value amounts to between 80 Volts and 100 Volts, in particular. This has the advantage that the zero-voltage switch is able to be operated only within this voltage window. Above this window, the current source is deactivated, and below this window, no charging current is flowing because the intermediate-circuit voltage exceeds the system phase voltage.

The voltage applied at the capacitor may be acquired, i.e. the intermediate-circuit voltage, and if a threshold value is exceeded, in particular a threshold value that lies between 200 Volts and 300 Volts, the enabling is withdrawn, in particular by the higher-level control; and/or if the threshold value is not attained, the enabling is granted. This has the advantage of increasing safety.

The voltage applied at the capacitor may be acquired, i.e. the intermediate-circuit voltage, and the enabling is granted when the peak value of the system phase voltage is reached, the reaching of the peak value being identified in particular when the intermediate-circuit voltage lies within a predefined value range and no further increase in the intermediate-circuit voltage is able to be detected for a predefined time interval. This is considered advantageous insofar as the safety is increased due to the zero-voltage switch being open, which means that the controllable switches of the rectifier are operating normally, i.e. the current sources apply a control current to the switches as a function of the system phase voltage.

The enabling may be withdrawn in an error case, in particular when a failure of a braking chopper is encountered. This is considered advantageous because it increases safety.

A first delay-time constant may be provided in the acquisition of the intermediate-circuit voltage, and a second delay-time constant may be provided in the trigger path of the current source, that is, when forwarding the enable signal to the current source, in particular, the first time constant being lower than the second delay-time constant. This has the advantage of preventing the triggering of the current source before the zero-voltage switch supplies a switch-off signal.

Example embodiments of the present invention are described in greater detail below with reference to the Figures.

DETAILED DESCRIPTION

Figure 1:
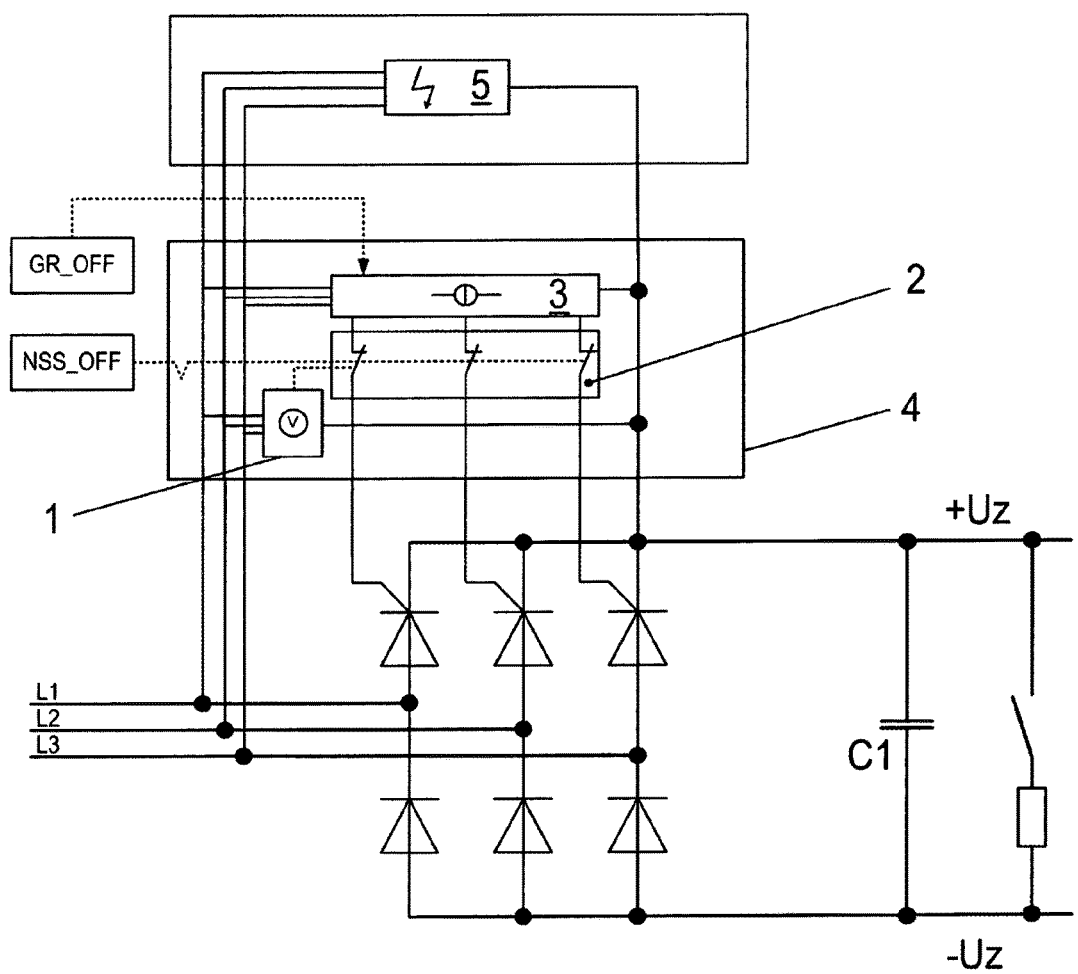
FIG. 1 schematically shows an exemplary embodiment according to the present invention, in which a three-phase semi-controlled system-rectifier bridge is controllable via a trigger device 4, which is supplied from system phases (L1, L2, L3) and is able to be operated as a function of control signals from a higher-level control; an overvoltage suppressor 5 is provided in this context, which rapidly respond to voltage fluctuations.

As depicted in FIG. 1, the semi-controlled rectifier bridge is supplied from the three-phase AC voltage supply, which includes phase lines L1, L2 and L3. Controllable power semiconductor switches, preferably thyristors, are situated in the upper branches of the three half-bridges, and diodes are situated in the lower branches. On the output side, the rectified voltage is supplied to intermediate-circuit capacitor C1, which contributes to smoothing of the voltage. This output voltage is also referred to as intermediate-circuit voltage.

A power inverter, which feeds an electric motor and thus makes it controllable on the basis of the rotational speed, is supplied from the intermediate circuit, that is to say, from the voltage applied at intermediate-circuit capacitor C1. In a regenerative operation of the motor, energy is routed from the motor via the power inverter into the intermediate circuit, thereby causing a rise in the intermediate-circuit voltage.

A series connection made up of a controllable switch S1, i.e. the braking chopper, and a braking resistor RB, is situated in parallel with intermediate-circuit capacitor C1, so that excessive voltage energy applied at intermediate-circuit capacitor C1 is able to be converted into heat with the aid of braking resistor RB.

Overvoltage suppressor 5 has three diodes (D3, D4, D5), each situated between a respective system phase line (L1, L2, L3) and a capacitor C2; they supply current from the system phase lines (L1, L2, L3) to capacitor C2 when the voltage applied at the system phase lines (L1, L2, L3) is higher than the voltage applied at capacitor C2. A discharge resistor R4 is switched in parallel with capacitor C2, so that the capacitor is discharged at a corresponding time constant if the voltage applied at capacitor C2 exceeds the voltages applied at the system phase lines (L1, L2, L3).

This allows for a very rapid reduction of overvoltage peaks in that energy is shunted to capacitor C2 when overvoltage peaks arise. Overvoltage suppressor 5 is especially advantageous when voltage changes are generated very suddenly, for instance due to the effects of lightning or the like.

Trigger device 4 is supplied from the system phase lines (L1, L2, L3) and generates the trigger signals for the controllable switches of the semi-controlled system-rectifier bridge. Trigger device 4 includes a trigger 1 functioning as zero-voltage switch, the current sources of current-source device 3, and controllable switch unit 2. Each system phase is allocated one of the current sources.

Current-source device 3, whose current sources are able to be switched off with the aid of a control signal GR_OFF for the rectifier, the signal being generated by a higher-level control, is provided to generate the trigger signals.

If an enabling of current-source device 3 is induced with the aid of control signal GR_OFF, the current generated by the current sources allocated to the respective system phases (L1, L2, L3) is routed through a controllable switch unit 2 and used as trigger signal for the controllable switch of the rectifier, in particular the semiconductor switch, corresponding to the respective system phase.

The controllable switches of controllable switch unit 2, provided to conduct the current of the respective current source of current-source device 3, are triggered by trigger 1, which can be enabled or blocked via control signal NSS_OFF generated by the higher-level control. Trigger 1, which is acting as zero-voltage switch, is connected to the system phases (L1, L2, L3) and includes a comparator, which in particular compares the intermediate-circuit voltage to the respective phase voltage while taking a threshold value into consideration.

According to FIG. 1, if enabling exists through control signal NSS_OFF, for instance when the system including the rectifier or the electric device including the rectifier, e.g., the converter etc., is switched on, it is thereby possible to separate the current source with the allocated control input of the controllable switch in the event that the difference from the intermediate-circuit voltage and the voltage value of a respective system phase drops below a positive threshold value or zero.

However, if the difference from the intermediate-circuit voltage and the voltage value of a respective system phase exceeds a positive threshold value or zero, the current source is connected to the control input of the controllable switch, but this requires the enablement by the higher-level control.

In addition, trigger 1 compares the intermediate-circuit voltage, i.e. the voltage applied at intermediate-circuit capacitor C1, to a threshold value, such as a further threshold value between 200 Volts and 300 Volts. If intermediate-circuit voltage Uz exceeds this further threshold value, the supply from the current sources is also interrupted.

That is to say, if no signal voltage NSS_OFF and also GR_OFF is initially applied when the electric device is switched on, the current sources are enabled. In this case, the current sources are thus supplied from the system phases (L1, L2, L3); and as the system phase voltage rises, they supply a respective control current to the inputs of the controllable switches of the semi-controlled system-rectifier bridge. As a consequence, the controllable switches, especially thyristors, then fire as a function of the system phase voltage. Following the firing, intermediate-circuit capacitor C1 is charged by the corresponding system phase voltage during its rise from zero. An excessive charging current and/or a charging-current rise is limited as a result. In particular, it is possible that the charging is substantially carried out by only one of the system phases within a system quarter period.

According to example embodiments of the present invention, the current sources allocated to the respective system phases are switchable with the aid of low-voltage control signals GR_OFF, and the current can be supplied to the control inputs of the controllable switches via the switches of switch unit 2, which are likewise controllable by low-voltage control signal NSS_OFF. A medium-voltage switch or a high-voltage switch is thus not required.

Therefore, if enable signals NSS_OFF and GR_OFF are granted by the higher-level control, the controllable switches are fired following the zero crossing of the respective phase voltage. This is the case because the respective current source is supplied from the respective system phase, for instance by a one-way rectification device, preferably by a single diode. In an error case or an overload, enable signal GR_OFF may be withdrawn so that no charging of intermediate-circuit capacitor C1 is able to be performed. The charging of intermediate-circuit capacitor C1 can be carried out within a system quarter period interval.

A MOSFET in a drain configuration may be used as a current source in each case.

MOSFETs in a source configuration may be used as switches of switch unit 2 in each case.

Figure 2:
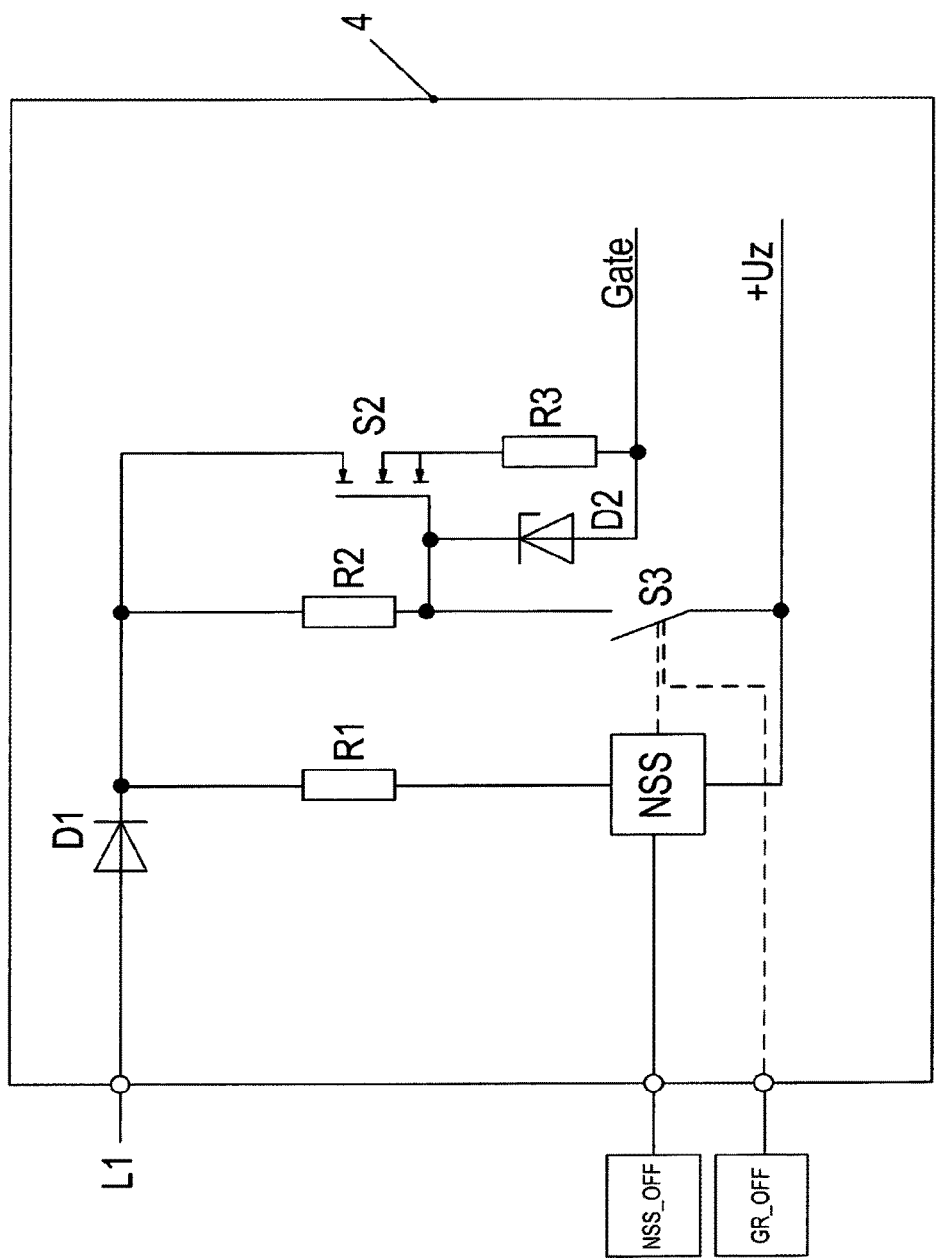
FIG. 2 shows a further exemplary embodiment according to the present invention in a specific circuit arrangement.
Figure 3:
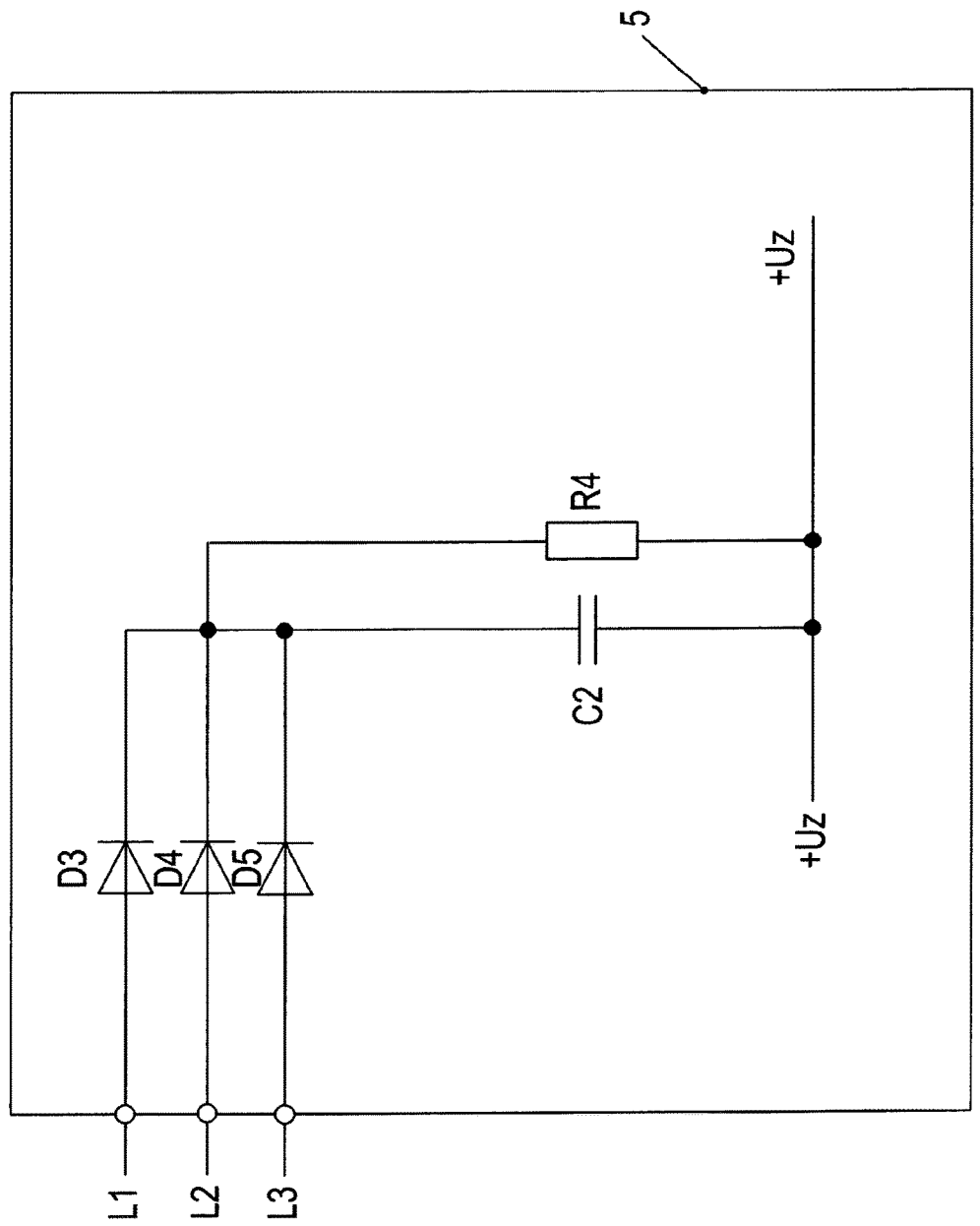
FIG. 3 shows an overvoltage suppressor 5 by way of example.

In the further exemplary embodiment according to the present invention, the trigger device for each system phase (L1, L2, L3) is implemented according to FIG. 2. The remaining circuitry corresponds to the aforementioned exemplary embodiment.

As illustrated in FIG. 2, a one-way rectifier, i.e. diode D1, is supplied via exemplary system phase L1. A series connection made up of controllable switch S2, in particular a MOSFET switch, and resistor R3 is supplied from the output voltage of the one-way rectifier. Via diode D1 and said series connection, the current from system phase L1, enabled by switch S2, is supplied to the control input, in particular the gate, of the controllable switch of the rectifier, in particular thyristor, allocated to system phase L1, when corresponding switch S3 is open.

A Zener diode D2 is provided to generate a defined trigger voltage for switch S2. A further series connection of Zener diode D2 and a resistor R2 is switched in parallel with said series connection. The control input of switch S2 is connected to the center tap of this further series connection.

Thus, a current source is formed with the aid of switch S2, which is supplied from system phase L1.

In addition, a further controllable switch S3 is provided, by which the upper potential of the intermediate-circuit voltage, i.e. the output voltage of the controlled rectifier, is able to be connected to the center tap; in other words, switch S3 functionally corresponds to a switch of controllable switch unit 4 according to FIG. 1, the firing of the controllable switches of the rectifier being prevented when respective switch S3 is closed, and the controllable switch becoming conductive as a function of the system phase voltage via one-way rectifier D1 when switch S3 is open.

Switch S3 is triggered as a function of signal NS_OFF and GR_OFF of the higher-level control.

The one-way rectifier is arranged only as diode D1 and has no smoothing capacitor.

Similar to FIG. 1, zero-voltage switch NSS is used as a trigger 1 for switch S3 of the controllable switch unit. Switch S3, which is assigned to system phase L1, is actuated by zero-voltage switch NSS, and thereby enables the firing of the controllable switches of the rectifier such as thyristors, only if the intermediate-circuit voltage, i.e. the voltage applied at capacitor C1, is greater than the voltage available at system phase L1, but less than an upper voltage value that exceeds the intermediate-circuit voltage by a voltage differential value, such as a value between 80 Volts and 100 Volts.

Switch S3 is thus kept open when the system phase voltage is within this voltage window above the intermediate-circuit voltage. In case of an even higher voltage, switch S3 is closed by zero-voltage switch NSS.

If the system phase voltage is lower than the intermediate-circuit voltage, a current flow through the voltage source, e.g., also a current flow through switch S2, is already automatically prevented.

Thus, zero-voltage switch NSS also includes a voltage acquisition device by which the intermediate-circuit voltage is acquired. A delay-time constant tau_1 is realized in the process.

Figure 4:
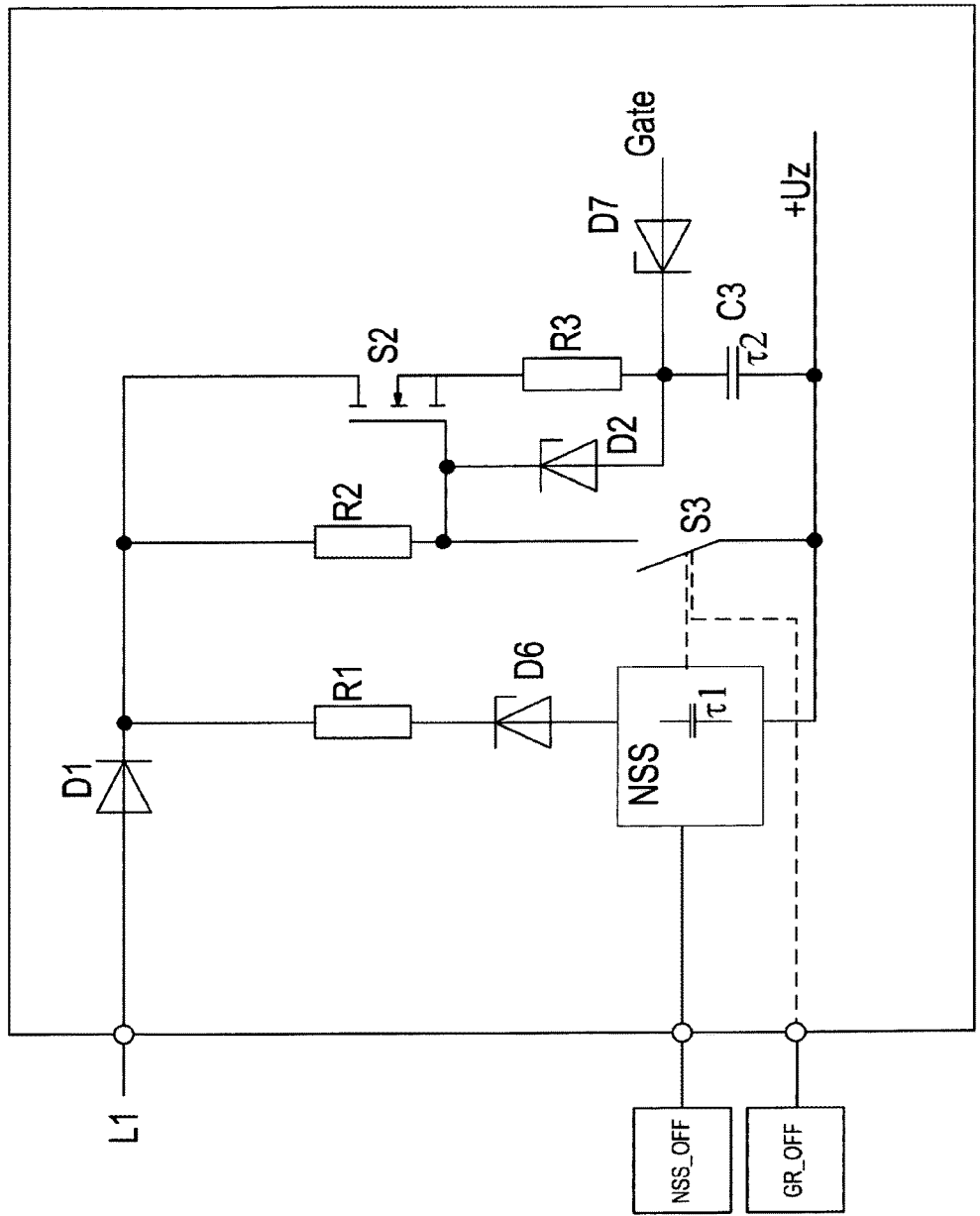
FIG. 4 shows a further exemplary embodiment according to the present invention in a specific circuit arrangement.

A delay-time means, which delays the triggering of switch S2, is provided as well, preferably in the trigger path of switch S2. Delay-time constant tau_2, which is greater than delay time constant tau_1, is provided for this purpose. Triggering of the gate of switch S2 before a switch-off signal generated by zero-voltage switch NSS takes effect is therefore prevented. The time delay can be realized with the aid of RC elements, so that a precise, defined delay-time constant is generated in each instance. In FIG. 2, the delay-time constants are induced by parasitic properties. In contrast to FIG. 2, FIG. 4 illustrates a example embodiment of delay-time constant tau_2 with the aid of component C3, i.e. capacitor C3, for clarification purposes. Delay-time constant tau_1 is indicated only symbolically. In addition, a Zener diode D6 for stabilizing the supply voltage for zero-voltage switch NSS is illustrated in FIG. 4. Zener diode D7 in the trigger path ensures a minimum voltage differential in the trigger path of the respective controllable switch of the rectifier.

In all other respects, the exemplary embodiment according to FIG. 2 and to FIG. 4 is arranged in the same manner.

The higher-level control withdraws enabling NSS_OFF of zero-voltage switch NSS if it is detected that the intermediate-circuit voltage has reached the peak value of the system voltage. To do so, it is monitored whether the acquired values of the intermediate-circuit voltage lie in a value range that is characteristic of a peak value; to increase the reliability, it is monitored whether the intermediate-circuit voltage is no longer rising. In other words, if no further rise is observed over an adequate period of time, and if the attained value lies in a mentioned value range, it is assumed that the intermediate-circuit voltage has reached the peak value of the AC voltage system. Thus, the higher-level control then outputs the signal NS_OFF, which means that zero-voltage switch NSS is deactivated, thereby also causing the opening or the continued opening of switch S3, in particular. As a result, the controllable switches of the rectifier, in particular thyristors, are then fired as a function of the system phase voltage, since the current source, in particular switch S2, is supplied and triggered by the system phase voltage. In this case the rectifier then operates in the known manner of a bridge rectifier.

If intermediate-circuit voltage Uz is lower than a further threshold value, e.g., a value between 200 Volts and 300 Volts, the enabling for zero-voltage switch NSS is granted, which means that switch S3 for zero-voltage switch NSS is enabled. Zero-voltage switch NSS thus operates in the afore-described manner, thereby causing an opening of switch S3 when the system phase voltage lies above the intermediate-circuit voltage within the window defined by the voltage-value differential.

LIST OF REFERENCE CHARACTER

1 Trigger zero-voltage switch
2 Controllable switch unit
3 Current-source device
4 Trigger device
5 Overvoltage suppressor
NSS Zero-voltage switch
C1 Intermediate-circuit capacitor
C2 Capacitor
C2 Capacitor
D1 Diode
D2 Zener diode
D3 Diode
D4 Diode
D5 Diode
D6 Zener diode
D7 Zener diode
R1 Resistor
R2 Resistor
R3 Resistor
R4 Resistor
RB Braking resistor
S1 Controllable switch, in particular braking chopper
S2 Controllable switch
L11 First system phase
L2 Second system phase
L3 Third system phase
Tau_1 Delay time constant
Tau_2 Delay time constant
NSS_OFF Control signal for the zero-voltage switch
GR_OFF Control signal for the rectifier
+Uz Positive intermediate-circuit potential
−Uz Negative intermediate-circuit potential

The invention claimed is:

1. A system, comprising:
a rectifier adapted to be supplied from system phases and adapted to provide a unipolar voltage on an output side, the rectifier including controllable switches; and
a capacitor and/or an intermediate-circuit capacitor arranged at the rectifier on the output side, and/or a series connection, including a braking resistor and a controllable switch, and/or a braking chopper arranged at the rectifier on the output side;
wherein a respective current source is suppliable from a respective system phase, the respectively generated current arranged as a trigger signal for the controllable switch allocated to the respective system phase as a function of a state of a controllable switch unit and/or as a function of a state of a zero-voltage switch;
wherein a first delay-time constant is provided in an acquisition of the intermediate-circuit voltage, and a second delay-time constant is provided in a trigger path of the current source and/or in a forwarding of an enable signal to the current source, the first time constant being smaller than the second delay-time constant.

2. The system according to claim 1, wherein the rectifier is arranged as a semi-controlled rectifier bridge and/or a converter.

3. The system according to claim 1, wherein the system phases include a three-phase AC voltage system.

4. The system according to claim 1, wherein the controllable switches include semiconductor switches and/or thyristors.

5. The system according to claim 1, wherein the respective current source is formed by a respective switch, supplied via a one-way rectifier from the respective system phase
wherein a control input of the switch is suppliable from an output of the one-way rectifier and/or from the unipolar output voltage of the one-way rectifier while another switch of the controllable switch unit is open; and
wherein the control input of the switch is able to be brought to a higher potential in comparison to the respective system phase, an upper intermediate-circuit potential, and/or an upper output potential of the rectifier, when the other switch of the controllable switch unit is closed, so that no current from one of the current sources is able to be supplied to the controllable switches.

6. The system according to claim 5, wherein the switch is adapted to be triggered as a function of signals from a higher-level control and/or the switch activatable as a function of a zero-voltage switch, a state of the zero-voltage switch being a function of the intermediate-circuit voltage and/or a function of the upper output potential of the rectifier and a respective system phase voltage as well as of signals from a higher-level control.

7. The system according to claim 1, wherein the controllable switches include switches triggerable by a trigger and/or a zero-voltage switch, a respective switch being allocated to a respective system phase, the trigger being controllable by a higher-level control with the aid of a trigger signal and/or the triggerable switches being controllable with the aid of a trigger signal of a higher-level control.

8. The system according to claim 1, wherein the current sources are controllable in each case, with the aid of a control signal supplied by a higher-level control.

9. The system according to claim 1, wherein the controllable switches of the rectifier and/or thyristors are arranged in an upper branch of each half-bridge of the rectifier.

10. The system according to claim 1, wherein a MOSFET switch is provided as the current source, and/or a MOSFET switch is provided as the controllable switch.

11. The system according to claim 1, wherein an overvoltage suppressor is supplied from the system phases, the overvoltage suppressor including a capacitor and diodes, and current from one of the system phases being supplied to the capacitor via the respective diode, a resistor being arranged in parallel with the capacitor.

12. A method for operating a rectifier that includes controllable switches, each controllable switch assigned to a respective system phase, comprising:
supplying the rectifier from the system phases;
supplying a unipolar voltage on an output side of the rectifier;
supplying a capacitor and/or an intermediate-circuit capacitor on the output side of the rectifier;
supplying a respective current source from a respective system phase;
using the current generated by the respective current source as a control current for the controllable switch allocated to the respective system phase as a function of a signal from a higher-level control; and
in an enablement by the higher-level control, charging the capacitor from one of the system phases with a voltage that rises substantially from zero and/or in a system quarter period;
wherein a first delay-time constant is provided in an acquisition of the intermediate-circuit voltage, and a second delay-time constant is provided in a trigger path of the current source and/or in a forwarding of an enable signal to the current source, the first time constant being smaller than the second delay-time constant.

13. The method according to claim 12, wherein the rectifier is arranged as a semi-controlled rectifier bridge and/or a power converter.

14. The method according to claim 12, wherein the system phases include a three-phase AC voltage system.

15. The method according to claim 12, wherein the controllable switches include semiconductor switches and/or thyristors.

16. The method according to claim 12, wherein the current generated by the current source is forwarded to one of the controllable switch of the rectifier when the corresponding system phase voltage is greater than an output voltage of the rectifier and/or an intermediate-circuit voltage, and when the corresponding system phase voltage is lower than a voltage value that exceeds the intermediate-circuit voltage by a predefined voltage-differential value and/or a value having an absolute value that is between 80 volts and 100 volts.

17. The method according to claim 12, wherein the voltage applied at the capacitor and/or the intermediate-circuit voltage is acquired, and if a threshold value and/or a threshold value that is between 200 volts and 300 volts is exceeded, the enablement is withdrawn, by the higher-level control, and/or if a drop below the threshold value occurs, the enablement is granted.

18. The method according to claim 12, wherein the voltage and/or the intermediate-circuit voltage is acquired, and if the peak value of the system phase voltage is reached, the enablement is granted, the reaching of the peak value being identified when the intermediate-circuit voltage lies within a predefined value range and no further rise of the intermediate-circuit voltage is able to be detected for a predefined time interval.

19. The method according to claim 12, wherein the enablement is withdrawn in an error case and/or in a failure of a braking chopper.

* * * * *